Oct. 21, 1941. J. L. LUNDBERG ET AL 2,260,147
SPRING LOCK NUT
Filed Dec. 2, 1936
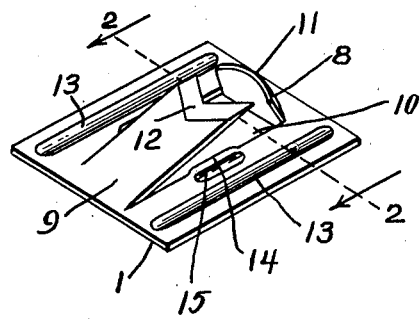
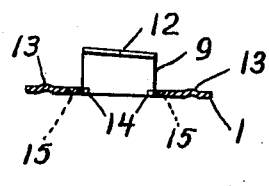
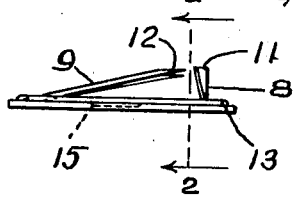
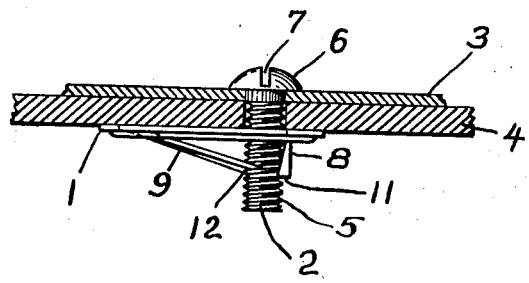
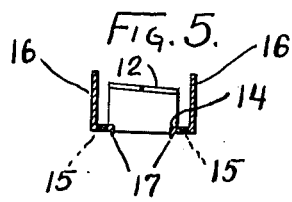
INVENTORS.
John L. Lundberg
Edward F. Smith
William D. Snyder
BY
ATTORNEY.

Patented Oct. 21, 1941

2,260,147

UNITED STATES PATENT OFFICE 2,260,147

SPRING LOCK NUT

John L. Lundberg and Edward F. Smith, Wyoming, Ohio, and William B. Snyder, Chicago, Ill., assignors to The Philip Carey Manufacturing Company, a corporation of Ohio Application December 2, 1936, Serial No. 113,850

10 Claims. (Cl. 85—36)

This invention relates to a spring nut that is adapted to be readily and quickly assembled with a stud member for clamping a member or members in position and locked to secure same in assembled position.

Generally described the invention comprises a blank of some such material as metal, preferably a heat treated tempered spring steel in strip form, having stud engaging tongues or prongs struck or stamped therefrom to extend from one face and so arranged that a holding stud may be inserted between the tongues or prongs and be engaged thereby. One of the tongues is disposed in position to provide a support against which the stud is adapted to rest and the other tongue is arranged in position to impinge against the stud and hold same against the first mentioned stud engaging tongue. The stud may be readily inserted between the stud engaging tongues and be engaged thereby and thus the spring nut may readily be employed to attach members together. The tongue or prong which provides the support against which the stud is adapted to rest may preferably be shaped to conform to the contour of the stud which is generally preferably cylindrical in conformation. The other tongue which impinges against the stud to hold same against the supporting stud is preferably bent transversely to the blank in order to incline the end of this tongue to the pitch of the screw thread provided on the screw stud. One side edge of the tongue may be cut longer than that of the other side to facilitate bending of the tongue, the longer side edge being pitched at a higher elevation than the shorter side edge. Frequently it is desired to clamp the spring nut securely in position against the stud and to prevent the impinging tongue from being drawn through the recess in the blank when it is screwed down, stop means may be advantageously provided on the blank.

For a better understanding of the invention, reference may be made to the accompanying drawing in which:

Fig. 1 is a perspective view of a spring nut embodying the invention;

Fig. 2 is a cross-sectional view taken on line 2—2 of Figs. 1 and 3;

Fig. 3 is a side elevational view of the spring nut;

Fig. 4 is a longitudinal sectional view of the spring nut assembled with a stud for securing two members together; and Fig. 5 is a cross-sectional view of another embodiment.

Referring specifically to the drawing in which like numerals are used to designate like parts, numeral 1 designates a sheet metal blank constructed to be associated with a stud member 2 for securing parts 3 and 4 together. The stud member is screw threaded at 5 and provided with a head 6 which may be grooved at 7 for receiving a suitable tool for turning same.

Preferably at an intermediate portion of the blank, stud engaging tongues 8 and 9 may be stamped or struck out to project from one face and leave the recess portion 10 through which the stud may be projected. One of these stud engaging prongs, that designated as 8 is preferably bent parallel to the longitudinal surface of the stud, which ordinarily is at a right angle or perpendicular to the blank, in order to provide an elongated back rest or support having a plurality of points for aligning the stud 2 in position and against which it is adapted to rest. This prong or tongue 8 is also preferably bent to provide a concave side adjacent to the stud receiving recess. The stud is preferably cylindrical in formation and the side of the back rest support is made concave to conform to the cylindrical curvature of the stud. If, however, the contour of the stud may be of any other configuration the configuration of the supporting prong or tongue may likewise be changed. The other engaging tongue or prong is bent at about a forty-five degree angle to the blank so as to have its end in position to engage the stud inserted in the recess between the stud engaging prongs or tongues, tongue or prong 9 being sufficiently resilient to yield upon insertion of the stud and then resiliently impinge the stud against the other tongue or prong 8. The adjacent ends of the two tongues or prongs may be severed apart without removing any intervening portion of the blank and with the adjacent ends thereof having complementary tongues and recesses of any desired contour. It is preferred that the end of the supporting tongue or prong 8 be provided with a projection 11, preferably convex, to provide the longest dimension of the tongue on the medial line parallel with the longitudinal surface of the stud. This will also result in providing a concave recess 12 on the end of the impinging tongue 9, also conforming substantially to the contour of the stud.

The tongue 9 is bent to have its free end portion inclined to the pitch of the screw threads 5 on the stud. This is facilitated by having the tongue 9 cut with one of its sides longer than the other. The free end portion of the tongue adjacent the longer side is at a higher elevation than the free end portion adjacent the shorter side.

Inasmuch as the blank is made from relatively thin and flexible sheet metal, it is preferable to reinforce it with a beading 13 disposed along one or both side edges, preferably continuous throughout the length of the blank. This reinforcement or reinforcements will compensate for any weakness resulting from cutting out the tongues or prongs. The metal is also heat treated and tempered so that with the reinforced portion or portions it is strong and durable but sufficiently yieldable to permit the stud member being snapped into place and having the impinging tongue flexed thereagainst.

In assembling the spring nut, it is usually sufficient to merely slip it over the stud with the members to be assembled positioned between the spring nut and the head of the stud. Ordinarily this is sufficient to hold the parts in assembled relation, but often times it is desired to lock the parts in assembled position. This may be effected by giving the stud member one or two turns with a suitable tool such as a screw driver which will draw the tongue 9 lightly down against the side of the stud. However, in order that the tongue 9 may not be drawn through the recess formed in the blank by the tongue being cut therefrom, projection means 14 may be suitably provided on each side edge of the recess. These may be readily formed at the time the blank is die stamped by embossing the blank at 15, thereby causing the projections 14 to be squeezed out from the edge of the recess to be engaged by the side edge of the tongue 9. When the stud is turned to clamp the impinging tongue in position it will be drawn down into substantially its original position and seated upon the projecting portions. Another important function of these projections 14 is that they prevent nesting of the nuts in the package or container in which they are shipped. If the nuts are not prevented from nesting, it is difficult to separate them apart ready for use.

It has also been found desirable to have the end of tongue 9 of sufficient thickness to fit into the groove of the stud and not upon the thread portion. Accordingly, the end may be conveniently reduced in thickness and nearly to a knife edge, and the ends of the fork or concave portion may be slightly bent downwardly, thereby bringing them nearer the center of the stud and disposing all points on the edge of the concave recess equally spaced from the center of the stud. This insures the edge of the tongue fitting into the groove of the screw thread and not upon the screw thread. The concave contour of the end of this tongue also conforms generally to the contour of the stud.

In the modified form, shown in Fig. 5, the edges of two of the sides may be conveniently upturned at 16 in addition to or in lieu of the reinforcing beadings 13. These not only function as reinforcements, but they also make the nut much narrower in length or width without any less length or width of the blank. They also provide the further advantage of permitting a tool to be readily engaged therewith, such as a wrench constructed to fit between the upturned edges for turning the nut. These upturned edges may be of any height but are preferably extended some distance above the heights of the tongues 11 and 12.

On the underside of the nuts a corner of the projection 14 may be advantageously overturned at 17 in order to provide means to bite into the adjacent member 4 to prevent the nut from readily loosening or turning after it has been secured in position. Or these portions 17 may be formed anywhere on the blank, either by overturning some corner edge or pressing out some embossment for this purpose.

While one embodiment of the invention has been described in detail, it will be understood that there may be various changes without departing from the spirit thereof.

We claim:

1. A securing nut comprising a metal blank having a stud engaging means comprising a stamped out tongue provided with a free end between two sides having an elongated stud engaging edge, one of which sides is longer in length than the other, the free end of the tongue being disposed transversely at an angle to the blank with the longer side and a portion of the free end adjacent said longer side in a higher elevation than the shorter side and a portion of the free end adjacent said shorter side.

2. A securing nut comprising a metal blank having a stud engaging means comprising a stamped out tongue having an elongated back rest portion parallel to the longitudinal surface of the stud providing a plurality of contacting points for guiding a stud in place and aligning same and means stamped from the blank to hold the stud against the back rest portion of the tongue, said stud holding means having one side longer and disposed in a higher elevation than the other.

3. A securing nut comprising a metal blank having a stud engaging means comprising a stamped out tongue provided with a free end between two sides having an elongated stud engaging edge, one of which sides is longer in length than the other, the free end of the stud engaging means being disposed transversely at an angle to the blank with the longer side and a portion of the free end adjacent said longer side in a higher elevation than the shorter side and a portion of the free end adjacent said shorter side and provided with an edge reduced in thickness.

4. In combination with a screw threaded stud, a securing nut comprising a metal blank having a stud engaging means comprising a stamped out tongue provided with a free end between two sides having an elongated stud engaging edge, one of which sides is longer in length than the other, the free end of the stud engaging means being disposed transversely at an angle to the blank with the longer side and a portion of the free end adjacent said longer side in a higher elevation than the shorter side and a portion of the free end adjacent said shorter side and provided with an edge sufficiently narrow in thickness to fit within the groove between the screw threads.

5. A securing nut comprising a metal blank having a stud engaging means comprising a tongue stamped from the blank and flexed at an angle thereto, and means extending from the blank across the normal margin of the recess resulting from the stamped tongue for holding the tongue from the recess.

6. A securing nut comprising a metal blank having a stud engaging means comprising oppositely disposed tongues stamped from the blank and flexed at an angle thereto, and means extending from the blank across the normal margin of the recess resulting from the stamped tongue for holding one of the tongues from the recess.

7. A securing nut comprising a metal blank having a stud engaging means comprising contiguous tongues stamped from the blank, one of the tongues being bent parallel to the longitudinal surface of the stud and the other tongue being bent at an angle thereto, and means extending from the blank across the normal margin of the recess resulting from the stamped tongue for holding the last mentioned tongue from the recess.

8. A securing nut comprising a metal blank having a stud engaging means comprising a stamped out tongue provided with a free end of substantial width between two sides, one of which is longer in length than the other, the free end of the stud engaging means being disposed at an angle to the blank with the longer side and portion of the free end adjacent said longer side at a higher elevation than the shorter side and a portion of the free end adjacent said shorter side.

9. A securing nut comprising a metal blank having a stud engaging means comprising a tongue stamped from the blank and an embossed portion adjacent the edge of the recess resulting from the stamped out tongue for narrowing the width of the recess to less than the width of the tongue.

10. A securing nut comprising a metal blank having a stud engaging means comprising stamped out tongues, one of which tongues has one side longer than the other side and a free notched end for engaging a stud, the free end being disposed transversely at an angle to the blank, with the portion adjacent the longer side in a higher elevation than the portion which is adjacent the shorter side.

JOHN L. LUNDBERG.
EDWARD F. SMITH.
WILLIAM B. SNYDER.